(12) United States Patent
Arakawa et al.

(10) Patent No.: US 11,418,953 B2
(45) Date of Patent: Aug. 16, 2022

(54) KEY INFORMATION GENERATION SYSTEM AND KEY INFORMATION GENERATION METHOD

(71) Applicant: KABUSHIKI KAISHA TOKAI RIKA DENKI SEISAKUSHO, Aichi (JP)

(72) Inventors: Masahiro Arakawa, Aichi (JP); Yuichi Inami, Aichi (JP); Hiroaki Iwashita, Aichi (JP); Hidenobu Hanaki, Aichi (JP); Masahiko Oya, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/045,337

(22) PCT Filed: Apr. 22, 2019

(86) PCT No.: PCT/JP2019/016926
§ 371 (c)(1),
(2) Date: Oct. 5, 2020

(87) PCT Pub. No.: WO2019/208465
PCT Pub. Date: Oct. 31, 2019

(65) Prior Publication Data
US 2021/0029539 A1    Jan. 28, 2021

(30) Foreign Application Priority Data

Apr. 24, 2018 (JP) .............................. JP2018-083242

(51) Int. Cl.
*H04W 12/04* (2021.01)
*H04W 12/00* (2021.01)
(Continued)

(52) U.S. Cl.
CPC ..... *H04W 12/041* (2021.01); *H04W 12/0433* (2021.01); *H04W 12/48* (2021.01); *H04W 12/71* (2021.01)

(58) Field of Classification Search
CPC ...... G06Q 50/10; H04W 12/48; H04W 12/71; H04W 12/041; H04W 12/63;
(Continued)

(56) References Cited

U.S. PATENT DOCUMENTS

| 10,242,516 B2 | 3/2019 | Konishi |
| 10,668,896 B2 | 6/2020 | Arakawa et al. |

(Continued)

FOREIGN PATENT DOCUMENTS

| JP | 2016-071834 A | 5/2016 |
| JP | 2016-115077 A | 6/2016 |

(Continued)

OTHER PUBLICATIONS

International Search Report, dated Jun. 4, 2019 by the Japan Patent Office (JPO), in International Application No. PCT/JP2019/016926.
(Continued)

*Primary Examiner* — Mohammad A Siddiqi
(74) *Attorney, Agent, or Firm* — Greenblum & Bernstein, P.L.C

(57) ABSTRACT

This key information generation system generates key information necessary when using a shared device and imparts this key information to a mobile terminal. Authentication is performed between a mobile terminal which has imported key information, and an authentication device provided to the device, and if said authentication is successful, the mobile terminal enables operation of the device via the authentication device. The key information generation system includes: an information management unit which manages, by associating with one another, individual information for the authentication device, a key information generating code, and usage information pertaining to the use of the authentication device; and a key information generation unit which specifies a key information generation code from the individual information and usage information managed by being associated with one another by the information management unit, and generates key information on the basis of the key information generation code.

5 Claims, 4 Drawing Sheets

(51) Int. Cl.
   *H04W 12/041* (2021.01)
   *H04W 12/0433* (2021.01)
   *H04W 12/71* (2021.01)
   *H04W 12/48* (2021.01)

(58) Field of Classification Search
   CPC . H04W 12/0433; H04W 12/047; H04W 4/40; H04W 12/03; E05B 49/00; B60R 25/24; H04L 63/0807; H04L 63/067
   See application file for complete search history.

(56) References Cited

U.S. PATENT DOCUMENTS

| | | | | |
|---|---|---|---|---|
| 2004/0268131 | A1* | 12/2004 | Kudo | H04L 63/0869 713/182 |
| 2013/0290735 | A1* | 10/2013 | Rombouts | G06F 21/33 713/189 |
| 2013/0305059 | A1* | 11/2013 | Gormley | H04L 9/0866 713/189 |
| 2013/0342314 | A1* | 12/2013 | Chen | G07C 9/00309 340/5.65 |
| 2016/0173277 | A1* | 6/2016 | Sakumoto | H04L 9/0894 380/277 |
| 2017/0278329 | A1 | 9/2017 | Konishi | |
| 2017/0287248 | A1* | 10/2017 | Aase | G07C 9/00309 |
| 2017/0374047 | A1 | 12/2017 | Fujiwara et al. | |
| 2018/0084427 | A1* | 3/2018 | Huo | H04W 12/08 |
| 2019/0001926 | A1 | 1/2019 | Arakawa et al. | |
| 2020/0028672 | A1* | 1/2020 | Tang | H04L 9/3297 |
| 2020/0099522 | A1* | 3/2020 | Yang | B60R 25/241 |

FOREIGN PATENT DOCUMENTS

| | | |
|---|---|---|
| JP | 2018-003330 A | 1/2018 |
| JP | 2019-012338 A | 1/2019 |

OTHER PUBLICATIONS

Written Opinion of the International Searching Authority, dated Jun. 4, 2019 by the Japan Patent Office (JPO), in International Application No. PCT/JP2019/016926.

* cited by examiner

Factory Ship-Out

Market Registration

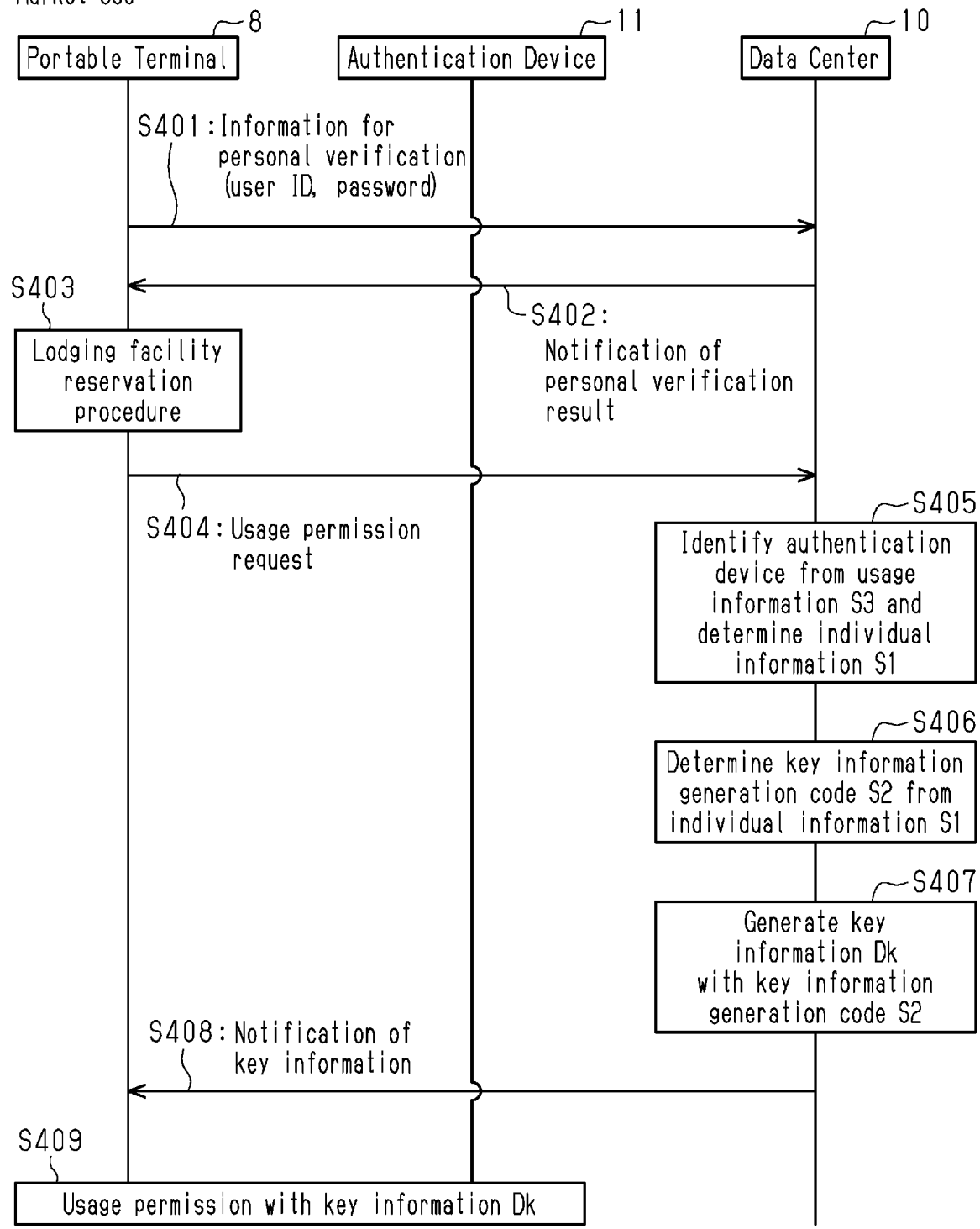

KEY INFORMATION GENERATION SYSTEM AND KEY INFORMATION GENERATION METHOD

TECHNICAL FIELD

The present disclosure relates to a key information generation system and a method for generating key information in which key information is generated and registered to a portable terminal.

BACKGROUND ART

A known example of a sharing system in which the same device is shared by a number of persons is a car sharing system in which the same vehicle is used by a number of persons (refer to Patent Documents 1 and 2). In this type of car sharing system, a user registers for use of the car sharing in advance. After making a reservation to use a vehicle with a portable terminal (high-performance mobile phone etc.), the user is allowed to use the vehicle during a reserved period of time.

PRIOR ART DOCUMENTS

Patent Documents

Patent Document 1: Japanese Laid-Open Patent Publication No. 2016-115077
Patent Document 2: Japanese Laid-Open Patent Publication No. 2016-71834

SUMMARY OF THE INVENTION

The inventors of the present invention have found how to apply this type of sharing system to a lodging facility that can be used for a vacation rental. In one example, key information, which is required for authentication when using a facility such as a lodging facility, is registered to the portable terminal to use the portable terminal as a key. For example, the portable terminal of the user transmits items, which are input by the user and necessary for generating key information, through a network to a data center. The data center generates key information based on the received necessary items and transmits the generated key information through the network to the portable terminal of the user. The portable terminal of the user receives the key information through the network from the data center. In this case, highly confidential information is input to the portable terminal and transmitted through the network. This may result in security issues.

It is an objective of the present disclosure to provide a key information generation system and a method for generating key information in which security is provided for the key information generation.

In one aspect of the present disclosure, a key information generation system is provided. In the key information generation system, key information necessary when using a shared apparatus is generated and assigned to a portable terminal. Authentication is performed with the portable terminal including the assigned key information and an authentication device arranged in the apparatus. When the authentication is successful, the portable terminal is allowed to operate the apparatus with the authentication device. The key information generation system includes an information management unit and a key information generation unit. The information management unit associates and manages individual information of the authentication device, a key information generation code necessary for generating the key information, and usage information related to use of the authentication device. The key information generation unit obtains the key information generation code using the individual information and the usage information, which are associated and managed by the information management unit, and generates the key information based on the key information generation code.

With the present configuration, for example, during market use where a user actually uses the apparatus, when a request for issuance of key information is received from the user, the usage information is obtained from the user through network communication, and the individual information and the key information generation code are obtained using the usage information at a data center or the like to generate key information. Thus, the usage information of the authentication device is the only information transmitted through the network when generating the key information during market use. In this case, the individual information and the like of the authentication device, which is confidential information, does not have to be transmitted. This ensures security of the key information generation.

In the key information generation system, it is preferred that the shared apparatus be one of multiple apparatuses. Preferably, the usage information is setting information that indicates in which one of the multiple apparatuses the authentication device is installed. With this configuration, the setting information that allows the apparatus to be identified is, for example, the address of the facility, a room number, and the like. Thus, the usage information can be input, for example, by inputting only the address or the room number where the apparatus is installed or the like. This simplifies the registration procedure of the usage information.

In the key information generation system, it is preferred that the individual information be a serial number of the authentication device. With this configuration, the individual information can be input by inputting only the serial number of the authentication device. This simplifies the registration procedure of the individual information.

In the key information generation system, it is preferred that the information management unit associate the individual information and the key information generation code when the authentication device is manufactured and shipped out of a factory, and the information management unit associate the individual information and the usage information during market registration when the authentication device is installed in the apparatus. With this configuration, the association of the individual information and the key information generation code of the authentication device can be managed in the factory which is isolated from the outside. This ensures security in managing the associations. Further, the individual information and the usage information of the authentication device are associated when attaching the authentication device to the apparatus. In this manner, the individual information and the usage information are associated during market registration. This avoids input errors when associating the individual information and the usage information.

In another aspect of the present disclosure, a method for generating key information is provided. In the method for generating key information, key information necessary when using a shared apparatus is generated and assigned to a portable terminal. Authentication is performed with the portable terminal that obtained the key information and an authentication device arranged in the apparatus. When the authentication is successful, the portable terminal is allowed to operate the apparatus with the authentication device. The method for generating key information includes the steps of associating and managing individual information of the authentication device, a key information generation code necessary for generating the key information, and usage information related to use of the authentication device. The method for generating key information also includes a step of obtaining the key information generation code using the individual information and the usage information, which are associated and managed, and generating the key information based on the key information generation code.

Effects of the Invention

The present disclosure provides security for the key information generation.

BRIEF DESCRIPTION OF THE DRAWINGS

FIG. 6 is a flowchart illustrating a procedure of the tasks performed during market use.

MODE FOR CARRYING OUT THE INVENTION

One embodiment of a key information generation system and a method for generating key information will now be described with reference to FIGS. 1 to 6.

Figure 1:
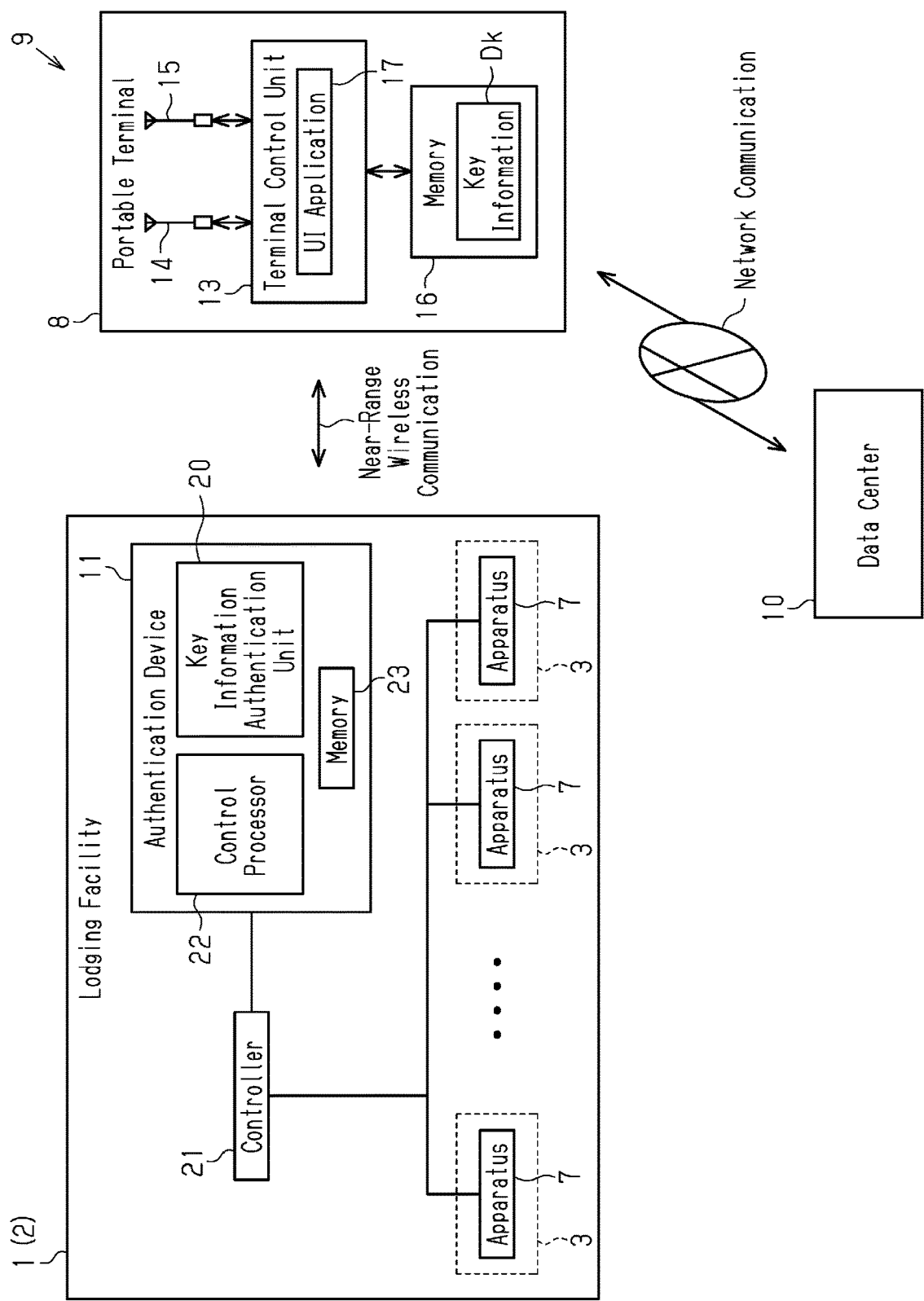
FIG. 1 is a diagram showing a key information generation system in accordance with one embodiment.

As shown in FIG. 1, in one embodiment, a facility 1 that is shared by a number of persons is a lodging facility 2. For example, the lodging facility 2 is used for a vacation rental and the like. The lodging facility 2 includes a plurality of lodging rooms 3. Vacant ones of the lodging rooms 3 can be rented by guests.

A sharing system 9 is applied to the lodging facility 2. In one embodiment, the lodging facility 2 includes an authentication device 11, a controller 21, and apparatuses 7. In the sharing system 9, a portable terminal 8 carried by a user can operate an apparatus 7 of the lodging facility 2 (for example, a door of reserved lodging room and the like) within a specified period of time reserved by the user. In one example of the sharing system 9, the portable terminal 8 receives and registers encrypted key information Dk from an external device (data center 10 in present example) and authenticates the key information Dk with the authentication device 11 of the lodging facility 2. One condition for operating the apparatus 7 is authentication result of the key information Dk. The key information Dk is, for example, one type of a code including an element limiting usage time. Preferably, the key information Dk is a one-time code (one-time password) that can be used only once or only within a fixed time period.

The portable terminal 8 includes a terminal control unit 13, a network communication module 14, a near-range wireless communication module 15, and a memory 16. The terminal control unit 13 controls actuation of the portable terminal 8. The network communication module 14 performs network communication in the portable terminal 8. The near-range wireless communication module 15 performs near-range wireless communication in the portable terminal 8. Data is readable from and rewritable to the memory 16. The portable terminal 8 obtains the key information Dk through network communication from the data center 10 and writes and stores the key information Dk in the memory 16. Preferably, the near-range wireless communication is, for example, Bluetooth® communication.

The portable terminal 8 includes a user interface application 17 that manages actuation of the sharing system 9 in the portable terminal 8. The user interface application 17 is provided in the terminal control unit 13. For example, the user interface application 17 is downloaded from the data center 10 to the portable terminal 8. The terminal control unit 13 executes the user interface application 17 to perform various types of operations such as a procedure for using the lodging facility 2 (personal verification, reservation procedure) and actuating the apparatus 7.

The authentication device 11 includes a key information authentication unit 20, a control processor 22, and a memory 23. The key information authentication unit 20 authenticates the key information Dk registered in the portable terminal 8. The control processor 22 actuates the apparatus 7. Data is readable from and rewritable to the memory 23. The key information authentication unit 20 obtains the key information Dk through near-range wireless communication from the portable terminal 8 and authenticates the key information Dk. When the key information Dk is authenticated, the key information authentication unit 20 activates the control processor 22.

When the control processor 22 is activated, the control processor 22 receives a request for operation of the apparatus 7 through near-range wireless communication from the portable terminal 8 and provides the received operation request for the apparatus 7 to the controller 21. The controller 21 operates the apparatus 7 in accordance with the operation request provided from the control processor 22. In this manner, the controller 21 operates the apparatus 7 in accordance with various types of requests from the control processor 22.

Figure 2:
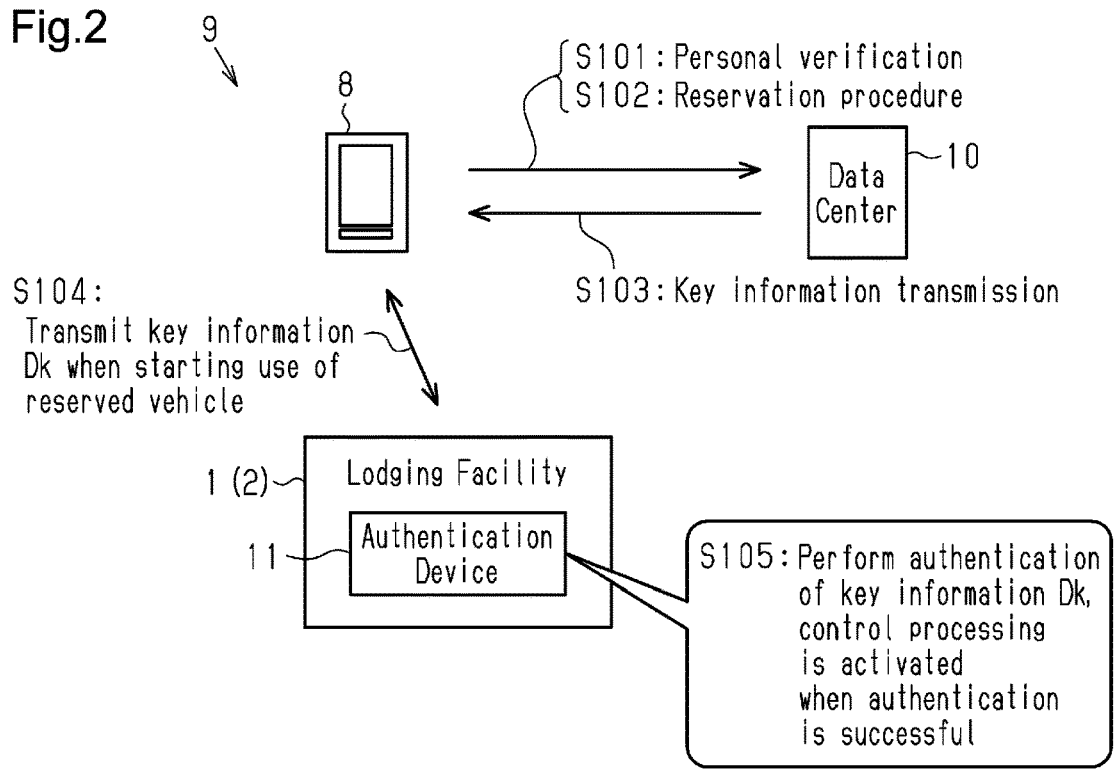
FIG. 2 is a diagram illustrating a key information authentication procedure.

FIG. 2 shows an authentication procedure of the key information Dk. In step 101 of FIG. 2, the portable terminal 8 performs personal verification through network communication with the data center 10. For example, the personal verification confirms a user ID and a password that are assigned when registering for use of the sharing system 9.

In step 102, the portable terminal 8 performs a procedure for reserving the lodging facility 2 through network communication with the data center 10. For example, in the reservation procedure, the portable terminal 8 receives information input by the user, such as the room of the lodging facility 2 that will be used and the date and time of the usage, and transmits the information to the data center 10.

In step 103, when the personal verification is successful, the data center 10 generates the key information Dk and transmits the generated key information Dk through network communication to the portable terminal 8. In this case, for example, the data center 10 generates the key information Dk using the information obtained in the reservation procedure. The key information Dk in the present example includes ciphertext generated by inputting information such as "reserved date and time", "terminal ID", and "user authentication code" that are expressed in plain text and an encryption code (e.g. authentication device unique code) of the authentication device 11 arranged in the reserved lodging facility to a cipher (encryption algorithm). The terminal ID is an ID unique to the portable terminal 8. The user authentication code is, for example, one type of a code that is encrypted and transmitted between the portable terminal 8 and the authentication device 11 when operating the apparatus 7 with the portable terminal 8. When the portable terminal 8 receives the key information Dk from the data center 10, the portable terminal 8 writes and stores the key information Dk in the memory 16.

In step 104, when starting use of the reserved lodging facility, the portable terminal 8 transmits the registered key information Dk through near-range wireless communication. The key information Dk is, for example, transmitted to the authentication device 11 using Bluetooth Low Energy (BLE).

In step 105, the authentication device 11 receives the key information Dk from the portable terminal 8 and authenticates the key information Dk. In the present example, the authentication device 11 decrypts the key information Dk with the encryption code (e.g. authentication device-specific code) and checks whether the decryption is successful. When the decryption of the key information Dk is successful, the authentication device 11 obtains "reserved date and time", "terminal ID", and "user authentication code" from the key information Dk. This allows the portable terminal 8 to operate the apparatus 7 (for example, door and the like) of the reserved lodging room 3 for the reserved specified period of time.

When the key information Dk is authenticated, the authentication device 11 is shifted to an "authentication completed state" of the key information Dk and the control processor 22 is activated. Thus, the control processor 22 is allowed to actuate the apparatus 7 with the controller 21. Further, when the key information Dk is authenticated, the authentication device 11 writes and stores the key information Dk and the user authentication code in the memory 23.

When the key information Dk is authenticated, the authentication device 11 performs near-range wireless communication to notify the portable terminal 8 of the user authentication code obtained through the authentication. The portable terminal 8 receives the user authentication code from the authentication device 11 and registers the user authentication code to the memory 16. In this manner, the user authentication code is registered to both of the portable terminal 8 and the authentication device 11. Accordingly, when the portable terminal 8 operates the apparatus 7 with the authentication device 11, the user authentication code will be used in encrypted communication established between the portable terminal 8 and the authentication device 11.

Figure 3:
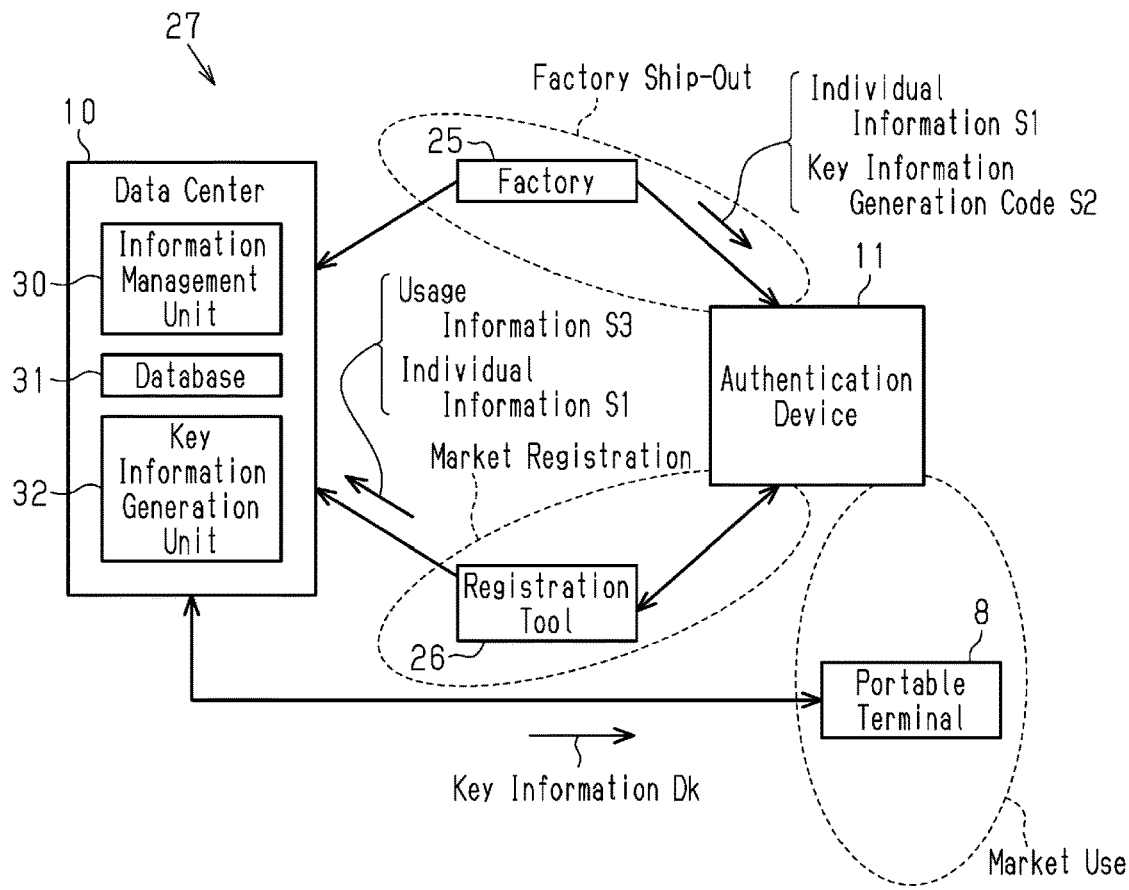
FIG. 3 is a schematic diagram showing a process from generation to assignment of key information.

As shown in FIG. 3, a key information generation system 27 that generates the key information Dk includes the data center 10, a factory 25, and a registration tool 26. The key information generation system 27 performs a registration procedure. Examples of the registration procedure include "factory ship-out", "market registration", and "market use". Factory ship-out refers to the registration procedure performed when the authentication device 11 is shipped out of the factory 25 that manufactures the authentication device 11. Market registration refers to the registration procedure performed when attaching the authentication device 11 to the lodging facility 2. Market use refers to the registration procedure performed when a user uses (reserves) the lodging facility 2. The registration tool 26 is configured to establish wireless communication or wired communication with the authentication device 11 and establish network communication with the data center 10.

The key information generation system 27 includes an information management unit 30 that manages multiple types of information that are associated with one another and necessary for the generation of the key information Dk. The information management unit 30 is arranged in the data center 10. The information management unit 30 associates individual information S1 of the authentication device 11, a key information generation code S2 necessary for generating the key information Dk, and usage information S3 related to the use of the authentication device 11. The information management unit 30 stores and manages the associated individual information S1, key information generation code S2, and usage information S3 in a database 31 of the data center 10. The database 31 stores the individual information S1, the key information generation code S2, the usage information S3, and information that associates the individual information S1, the key information generation code S2, and the usage information S3. That is, the information that associates the individual information S1, the key information generation code S2, and the usage information S3 is managed in the database 31. In one embodiment, the individual information S1 is a serial number of the authentication device 11. The key information generation code S2 is a code that is a source of the encryption code for encrypting a group of parameters such as "reserved time" when generating the key information Dk. In the case of the lodging facility 2, the usage information S3 is setting information associated with where the authentication device 11 is set. For example, the usage information S3 (setting information) is the address of the lodging facility 2 or the room number of the lodging room 3.

The key information generation system 27 includes a key information generation unit 32 that generates the key information Dk from the multiple types of associated information managed by the information management unit 30. The key information generation unit 32 is arranged in the data center 10. The key information generation unit 32 obtains the key information generation code S2 using the individual information S1 and the usage information S3 managed by the information management unit 30 and generates the key information Dk from the key information generation code S2.

The operation and advantages of the key information generation system 27 of the present embodiment will now be described with reference to FIGS. 4 to 6.

Figure 4:
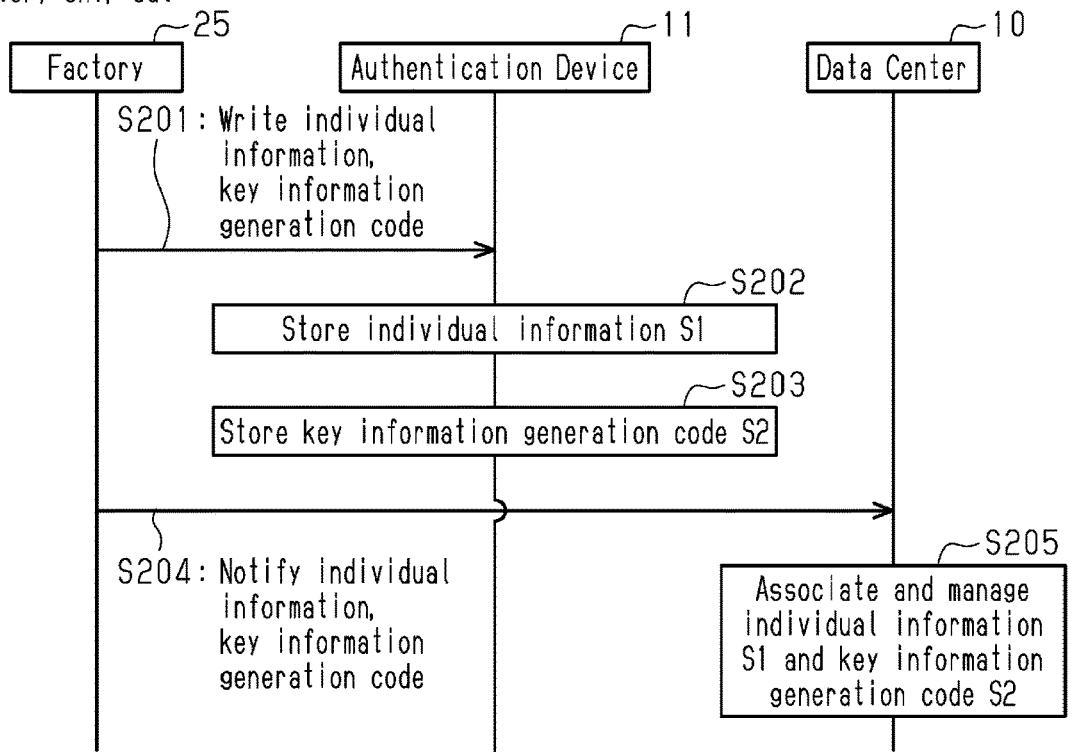
FIG. 4 is a flowchart illustrating a procedure of the tasks performed during factory ship-out.

FIG. 4 illustrates a procedure of the tasks performed when shipped out of a factory. In step 201 of FIG. 4, a writing device in the factory 25 writes the individual information S1 and the key information generation code S2, which is assigned to the authentication device 11, to the authentication device 11. The wiring procedure may be performed through wireless communication or wired communication. In another example, a technician in the factory 25 may input the individual information S1 and the key information generation code S2 to the authentication device 11.

In step 202, the authentication device 11 stores the individual information S1 obtained at the factory 25 in the memory 23.

In step 203, the authentication device 11 stores the key information generation code S2 obtained at the factory 25 in the memory 23.

In step 204, a communication device in the factory 25 notifies the data center 10 of the individual information S1 and the key information generation code S2, which are written to the authentication device 11, through network communication. In another example, a technician in the factory 25 notifies the data center 10 of the individual information S1 and the key information generation code S2, which are written to the authentication device 11, by delivering a paper medium. Notification of the individual information S1 and the key information generation code S2 do not have to be performed through network communication or by delivering paper medium and may be performed by any of various types of other means.

In step 205, the information management unit 30 of the data center 10 receives the notification of the individual information S1 and the key information generation code S2 from the factory 25, associates the individual information S1 and the key information generation code S2, and writes and manages the associated individual information S1 and key information generation code S2 to the database 31 for management.

Figure 5:
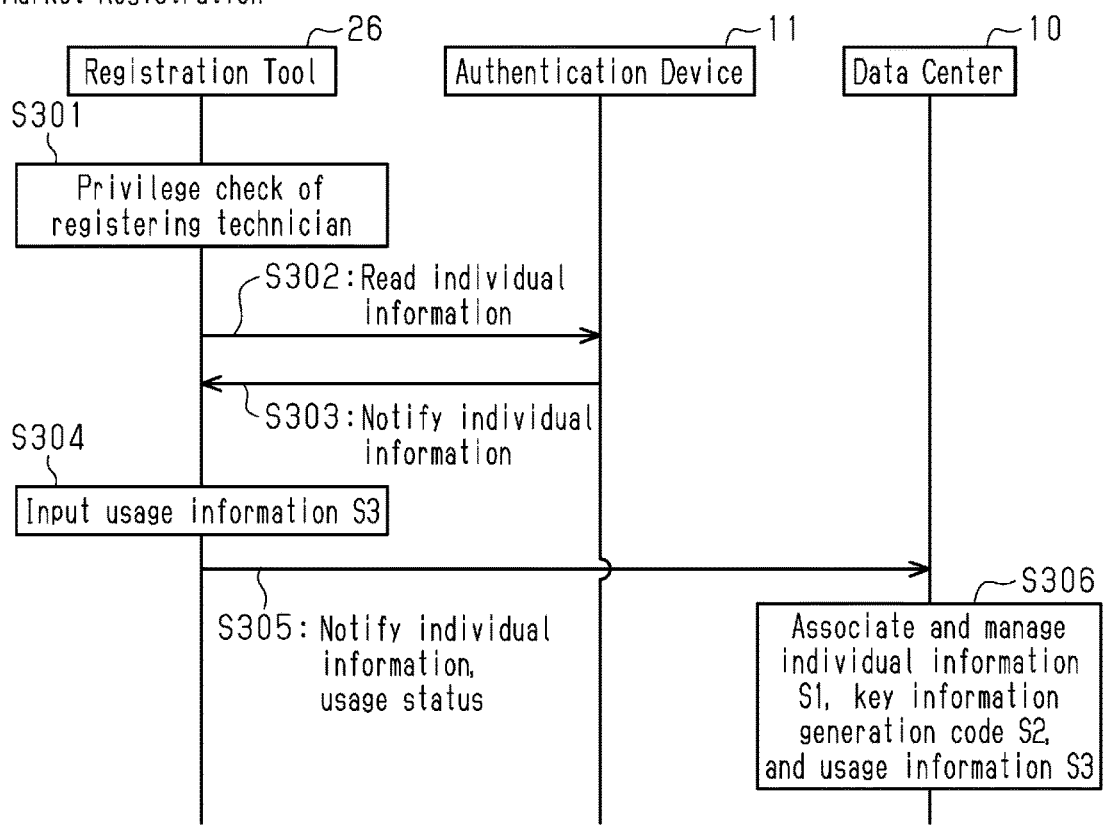
FIG. 5 is a flowchart illustrating a procedure of the tasks performed during market registration.

FIG. 5 illustrates a procedure of the tasks performed during market registration. In step 301 of FIG. 5, the registration tool 26 performs a registering technician privilege check to confirm that the market registration is performed by an authorized technician. For example, the registering technician privilege check is performed by checking a technician ID, a password, and the like.

In step 302, when the privilege of the registered technician is confirmed, the registration tool 26 reads the individual information S1 of the authentication device 11. In this case, the registration tool 26 transmits an individual information read request to the authentication device 11.

In step 303, the authentication device 11 receives the individual information read request from the registration tool 26 and provides the individual information S1, which is registered in the memory 23, to the registration tool 26.

In step 304, when the registration tool 26 receives the individual information S1 from the authentication device 11, the registration tool 26 receives the usage information S3 related to the use of the authentication device 11. In the present example, the usage information S3 includes information that determines the lodging facility 2 in which the authentication device 11 is installed. The usage information S3 may include at least one of the address of the lodging facility 2 and the room number of the lodging room 3. Alternatively, various types of information can be applied as the usage information S3. In the present example, the technician operates a group of buttons arranged on the registration tool to input the usage information S3 of the authentication device 11 to the registration tool.

In step 305, the registration tool 26 notifies the data center 10 of the individual information S1 and the usage information S3 input to the registration tool 26 through network communication. In another example, the notification of the individual information S1 and the usage information S3 does not have to be performed through network communication and may be performed through various types of means such as by delivering paper medium.

In step 306, the information management unit 30 of the data center 10 receives the notification of the individual information S1 and the usage information S3 from the registration tool 26. The information management unit 30 associates the individual information S1 and the usage information S3 and writes the associated individual information S1 and usage information S3 in the database 31 for management. In the present example, the information management unit 30 receives the notification of the individual information S1 and the usage information S3 from the registration tool 26, associates the individual information S1, the key information generation code S2, and the usage information S3 based on the individual information S1 and the key information generation code S2 stored in the database 31, and writes the associated individual information S1, key information generation code S2, and usage information S3 to the database 31 for management.

FIG. 6 illustrates a procedure of the tasks performed during market use. In step 401 of FIG. 6, the portable terminal 8 performs personal verification required for a user to use the lodging facility 2 (apparatus 7) with the portable terminal 8. For example, a user inputs a user ID and a password, which are assigned when registering for use of the sharing system 9, to the portable terminal 8. The portable terminal 8 receives the user ID and the password and transmits the information through network communication to the data center 10.

When the data center 10 receives the information for personal verification from the portable terminal 8, the data center 10 uses the information to verify the identity of the user. When determining that the user ID and the password are valid, the data center 10 acknowledges accomplishment of personal verification and continues the process. When determining that the user ID and the password are invalid, for example, when the user ID and the password cannot be confirmed, the data center 10 acknowledges non-accomplishment of personal verification and forcibly ends the process.

In step 402, the data center 10 transmits a notification of the personal verification result through network communication to the portable terminal 8.

In step 403, after the personal verification is completed, the portable terminal 8 performs a procedure for reserving the lodging facility 2 (lodging room 3). In the present example, the portable terminal 8 receives information input by the user that is necessary for the reservation procedure. For example, the information necessary for the reservation procedure includes the lodging facility (lodging room) that will be used and the date and time of the usage. The information necessary for the reservation procedure may further include the usage information S3 (e.g. address, room number, and the like) of the authentication device 11.

In step 404, when the portable terminal 8 accepts the user input of the information necessary for the reservation procedure, the portable terminal 8 transmits a request for permission to use the lodging facility 2 (lodging room 3) through network communication to the data center 10. In the present example, the usage permission request includes the lodging facility that will be used, the lodging room that will be used, the date and time of the usage, the usage information S3 of the authentication device 11, and the ID of the portable terminal (terminal ID), which were input when performing the procedure for using the lodging facility 2 (lodging room 3).

In step 405, the key information generation unit 32 of the data center 10 receives the usage permission request from the portable terminal 8 and accesses the database 31 to identify the lodging facility 2 (lodging room 3) that is the subject of reservation, which is associated with the usage information S3 included in the usage permission request. The key information generation unit 32 obtains the individual information S1 of the lodging facility 2 (lodging room 3) of the reservation subject. In other words, the key information generation unit 32 of the data center 10 accesses the database 31 and identifies the lodging facility 2 (lodging room 3) of the presently reserved subject based on the usage information S3 included in the usage permission request.

In step 406, the key information generation unit 32 of the data center 10 accesses the database 31 to obtain the key information generation code S2 that is to be used and is associated with the obtained individual information S1. In other words, the key information generation unit 32 accesses the database 31 to determine the key information generation code S2 that is to be presently used based on the obtained individual information S1.

In step 407, the key information generation unit 32 of the data center 10 generates the key information Dk from the obtained key information generation code S2 and assigns the key information Dk to the portable terminal 8. In the present example, the key information generation unit 32 generates an encryption code, which is used when generating the key information Dk, from the obtained key information generation code S2. For example, the key information generation unit 32 generates the key information Dk by inputting "reserved date and time", "terminal ID", and "user authentication code", which are expressed in plain text, and the encryption code (e.g. authentication device unique code), which is generated from the key information generation code S2, to a cipher (encryption algorithm).

In step 408, the key information generation unit 32 of the data center 10 notifies the portable terminal 8 of the generated key information Dk through network communication. The portable terminal 8 receives the key information Dk from the data center 10 and registers the key information Dk to the memory 16.

In step 409, the portable terminal 8 obtains permission to use the lodging facility 2 (lodging room 3) from the authentication device 11 with the key information Dk. In other words, when the key information Dk undergoes authentication through a process similar to step 104 and step 105 and the authentication is successful, the same user authentication code will be registered to both of the portable terminal 8 and the authentication device 11. This allows the portable terminal 8 to operate the apparatus of the lodging facility 2 with the authentication device 11.

In the present example, during market use where a user actually uses the apparatus 7 (facility 1), when the portable terminal 8 receives a request for issuance of the key information Dk from the user, the data center 10 obtains the usage information S3 through network communication from the portable terminal 8. The data center 10 finds the individual information S1 and the key information generation code S2 of the authentication device 11 with the obtained usage information S3 to generate the key information Dk. Thus, the usage information S3 of the authentication device 11 is the only information transmitted through the network when generating key information during market use. In this case, the individual information S1 and the like of the authentication device 11, which is confidential information, does not have to be transmitted. This provides security for key information generation.

The usage information S3 is the setting information (information indicating which apparatus 7 or facility 1 includes authentication device 11) used to identify the apparatus 7 (facility 1). For example, the setting information used to identify the apparatus 7 includes the address of the location where the apparatus 7 is installed. When the facility 1 is the lodging facility 2, the setting information used to identify the apparatus 7 includes the room number in which the apparatus is installed. Thus, the usage information S3 can be input by inputting only the address of the location or the room number where the apparatus 7 is located or the like. This simplifies the registration procedure of the usage information S3.

For example, the individual information S1 is a serial number of the authentication device 11. In this case, the individual information S1 can be input by inputting only the serial number of the authentication device 11. This simplifies the registration procedure of the individual information S1.

The information management unit 30 associates the individual information S1 and the key information generation code S2 after the authentication device 11 is manufactured and during factory ship-out and associates the individual information S1 and the usage information S3 during market registration when the authentication device 11 is installed in the apparatus 7. Thus, the association of the individual information S1 and the key information generation code S2 of the authentication device 11 can be managed in the factory which is isolated from the outside. This ensures security for association managements. Further, the individual information S1 and the usage information S3 of the authentication device 11 are associated when attaching the authentication device 11 to the facility 1. In this manner, the individual information S1 and the usage information S3 are associated during market registration. This avoids errors when associating the individual information S1 and the usage information S3.

The present embodiment may be modified as follows. The present embodiment and the following modifications can be combined as long as the combined modifications remain technically consistent with each other.

The individual information S1 and the key information generation code S2 may be associated through any procedure. Further, the individual information S1, the key information generation code S2, and the usage information S3 may be associated through any procedure.

The individual information S1 may be any unique information assigned to each authentication device 11.

The key information generation code S2 is not limited to a code that is the source of the encryption code used to generate the key information Dk. The key information generation code S2 may be any information related to the generation of the key information Dk.

The usage information S3 is not limited to the setting information and may be any information indicating where the authentication device 11 is attached.

The information management unit 30 and the key information generation unit 32 may be arranged at a location other than the data center 10.

The authentication device 11 may be retrofitted to the facility 1 or installed in the facility 1 in advance.

The authentication device 11 may be mounted anywhere on the facility 1.

The reservation procedure of the facility 1 does not have to be performed with the portable terminal 8 and may be performed with another terminal.

The key information Dk is not limited to a one-time code and may be any information including an element limiting usage time.

The content included in the key information Dk may be changed from that of the embodiment.

The key information Dk does not have to be generated at the data center 10 and may be generated at any external facility.

The portable terminal 8 is not limited to a high-performance mobile phone and may be changed to various types of terminals.

The portable terminal 8 and the authentication device 11 may obtain the user authentication code through any procedure and methods.

The control processor 22 may be activated on under any condition.

The near-range wireless communication is not limited to Bluetooth® communication and may be established through another communication protocol.

Various types of frequencies and communication protocols may be applied to communication between the portable terminal 8 and the authentication device 11, and communication between the portable terminal 8 and the data center 10.

The encryption code used for authentication and encrypted communication may be, for example, any of the key information Dk, the authentication device-specific code, the user authentication code, and the key-unique code. For example, switching encryption codes during the process will be further advantageous for ensuring the communication security. Further, the encryption code used is not limited to the above-mentioned codes and may be changed to various types of codes.

The communication between the authentication device 11 and the controller 21 may be established through wireless connection or wired connection.

The facility 1 is not limited to the lodging facility 2 and may be changed to another service-related apparatus such as a parking lot that is rented by the hour.

The apparatus 7 is not limited to a door and the like and may be changed to another member such as a vehicle.

In the above embodiment, the authentication device 11, the terminal control unit 13, the information management unit 30, and the controller 21 may each include one or more dedicated circuits or one or more processors. Further, the memories 16 and 22 (non-transitory computer-readable storage medium) may store one or more programs including commands that are executable by one or more processors. When executed, the commands are configured to have the processors perform the key information generation process in accordance with the present disclosure. For example, the programs include commands that are configured to have the processors perform processes corresponding to steps 201 to 205 of the sequence illustrated in FIG. 4, steps 301 to 306 of the sequence illustrated in FIG. 5, and steps 401 to 407 of the sequence illustrated in FIG. 6. Therefore, the present disclosure also allows a non-transitory computer-readable storage medium that stores such a program to be provided.

The invention claimed is:

1. A key information generation system in which key information necessary when using a shared apparatus is generated and assigned to a portable terminal,
wherein authentication is performed with the portable terminal including the assigned key information and an authentication device arranged in the apparatus, and when the authentication is successful, the portable terminal is allowed to operate the apparatus with the authentication device, the system comprising:
an information management unit that associates and manages individual information of the authentication device, a key information generation code necessary for generating the key information, and usage information related to use of the authentication device; and
a key information generation unit that obtains the key information generation code using the individual information and the usage information, which are associated and managed by the information management unit, and generates the key information based on the key information generation code,
wherein the information management unit associates the key information generation code and the individual information that is information assigned to the authentication device, and then associates the usage information and the individual information, and
the association of the key information generation code and the individual information and the association of the usage information and the individual information are performed at different timings before a reservation of a reservation subject corresponding to the authentication device.

2. The key information generation system according to claim 1,
wherein the shared apparatus is one of multiple apparatuses, and
the usage information is setting information that indicates in which one of the multiple apparatuses the authentication device is installed.

3. The key information generation system according to claim 1,
wherein the individual information is a serial number of the authentication device.

4. The key information generation system according to claim 1,
wherein the information management unit associates the individual information and the key information generation code when the authentication device is manufactured and shipped out of a factory, and the information management unit associates the individual information and the usage information during market registration when the authentication device is installed in the apparatus.

5. A method for generating key information in which key information necessary when using a shared apparatus is generated and assigned to a portable terminal, wherein authentication is performed with the portable terminal that obtained the key information and an authentication device arranged in the apparatus, and when the authentication is successful, the portable terminal is allowed to operate the apparatus with the authentication device, the method comprising:
associating and managing individual information of the authentication device, a key information generation code necessary for generating the key information, and usage information related to use of the authentication device,
wherein the associating and managing include associating the key information generation code and the individual information that is information assigned to the authentication device, and then associating the usage information and the individual information, and
the association of the key information generation code and the individual information and the association of the usage information and the individual information are performed at different timings before a reservation of a reservation subject corresponding to the authentication device; and
obtaining the key information generation code using the individual information and the usage information, which are associated and managed, and generating the key information based on the key information generation code.

* * * * *